United States Patent [19]

Brannan

[11] 3,773,271

[45] Nov. 20, 1973

[54] SELF-REWINDING MACHINE CONTROL TAPE CASSETTE

[76] Inventor: Walter F. Brannan, Rolling Hills, Calif.

[22] Filed: Mar. 8, 1971

[21] Appl. No.: 122,061

[52] U.S. Cl. .............. 242/55.19 A, 352/78, 352/128

[51] Int. Cl. .............. B65h 17/48

[58] Field of Search .............. 242/55.19 A, 55.19; 352/128, 78, 72; 179/100.22

[56] References Cited

UNITED STATES PATENTS

| | | | |
|---|---|---|---|
| 3,590,221 | 6/1971 | Malkowski | 242/55.19 A |
| 2,656,184 | 10/1953 | Eddy | 242/55.19 A |
| 3,041,925 | 7/1962 | Bavaro | 242/55.19 R |
| 2,546,124 | 3/1951 | Hart | 242/55.19 A |

*Primary Examiner*—Billy S. Taylor
*Attorney*—Lynn H. Latta

[57] ABSTRACT

A machine tool tape control includes an endless tape coil rotatably contained in a cassette casing which is mounted directly below the tape-reading head of the machine in an upwardly and outwardly inclined position such that an external loop of the tape leaves the inside of the coil, emerges through a medial slot in the rear side of the casing, and extends directly upwardly to the reading head and thence downwardly and back into the casing through an end opening therein, from which it extends tangentially to the periphery of the roll and is wound externally thereon.

7 Claims, 8 Drawing Figures

INVENTOR.
WALTER F. BRANNAN
BY
Lynn H Latta
-ATTORNEY-

INVENTOR.
WALTER F. BRANNAN
BY Lynn H Latta
-ATTORNEY-

INVENTOR.
WALTER F. BRANNAN
BY Lynn H. Latta
-ATTORNEY-

SELF-REWINDING MACHINE CONTROL TAPE CASSETTE

BACKGROUND OF THE INVENTION

Numerical automatic control of machine tools by tape carrying messages (e.g., perforations) which are read by a head over which the tape is fed and which reads the tape and correspondingly directs a series of operations by the machine on a part being machined, are well known and widely used in the machine tool art. Such machines are commonly provided with respective feed and takeup reels between which the tape passes the reading head. Where a succession of identical parts are to be produced by the machine, it is customary to rewind the tape after each part is completed. During the rewinding stage the operator must wait for the tape to rewind before starting the next cycle of machining operation. To save the rewinding time, return-feed units have been designed to handle an endless tape by taking up the stretch of tape leaving the reading head, roll-feeding it into one end of a coil, and delivering it from the other end of the coil back to the reading head. Such return-feed units, positioned externally of the reading cabinet of the machine, require separate drive means for roll-feeding the tape through the unit, involving extra equipment and corresponding extra expense.

SUMMARY OF THE INVENTION

In general, the invention provides a coil-holding and return-feeding cassette attached to a reading unit in a close association with its reading head such that the existing drive element (e.g. sprocket) of the reading head can be utilized to withdraw the tape from the center of the coil in the cassette, draw it out of the cassette and directly past the reading head, and feed it into a free-encircling external loop returning to the cassette and entering it on a path tangent to the periphery of the coil so as to be rewound on the coil, the coil being rotated in response to the withdrawal of the tape from its center.

OBJECTS OF THE INVENTION

The general object of the invention is to provide a relatively simple and inexpensive cassette and reading unit assembly for holding a coil of machine control tape, feeding an external loop thereof to a reading head, and receiving the returning end of the loop for rewinding on the coil. More specific objects are to provide such an assembly:

1. wherein the tape-feeding drive of the reading unit is utilized to withdraw the tape from the cassette so as to cause the roll within the cassette to rotate and thereby effect the takeup and rewinding of the returning end of the external loop upon the coil;

2. wherein separate power-driven feed rolls in the coil-holding, dispensing and rewinding unit, are dispensed with;

3. wherein the cassette is attached directly to the reading unit; and 4. wherein the cassette is in close proximity to the reading head and the tape is fed from the cassette to the reading head in a short straight stretch adapted to transmit the pull of the reading unit drive directly to the coil in a reliable manner throughout any required number of cycles of operation.

These and other objects will become apparent in the ensuing specifications and appended drawings, wherein:

DESCRIPTION

Figures 1, 2, 5, 6:
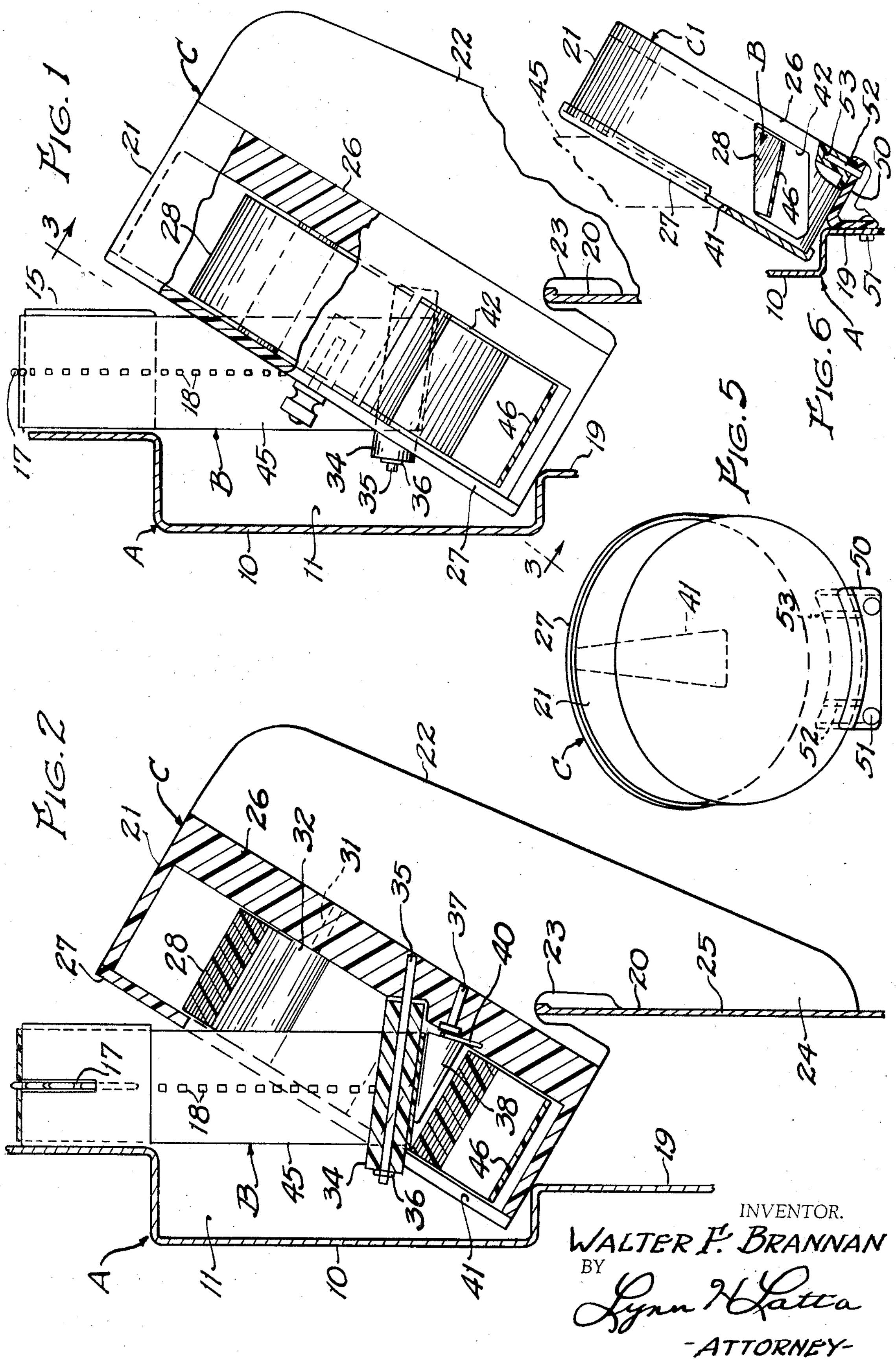
FIG. 1 is a vertical sectional view through a portion of a machine control tape reading unit equipped with the tape-feeding cassette of my invention.
FIG. 2 is a vertical sectional view through the cassette and reading unit assembly.
FIG. 5 is a front elevational view of a modified form of the invention.
FIG. 6 is a side elevational view of the same.
Figure 3:
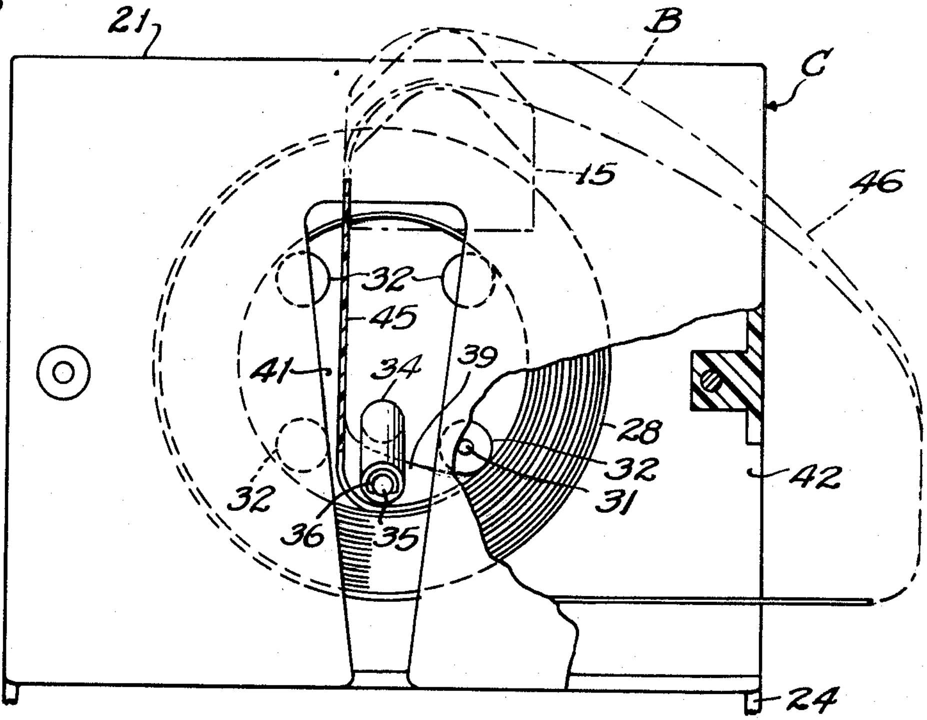
FIG. 3 is a rear elevational view of the cassette viewed along the inclined axis of the tape coil as indicated by line 3—3 of FIG. 1.
Figure 4:
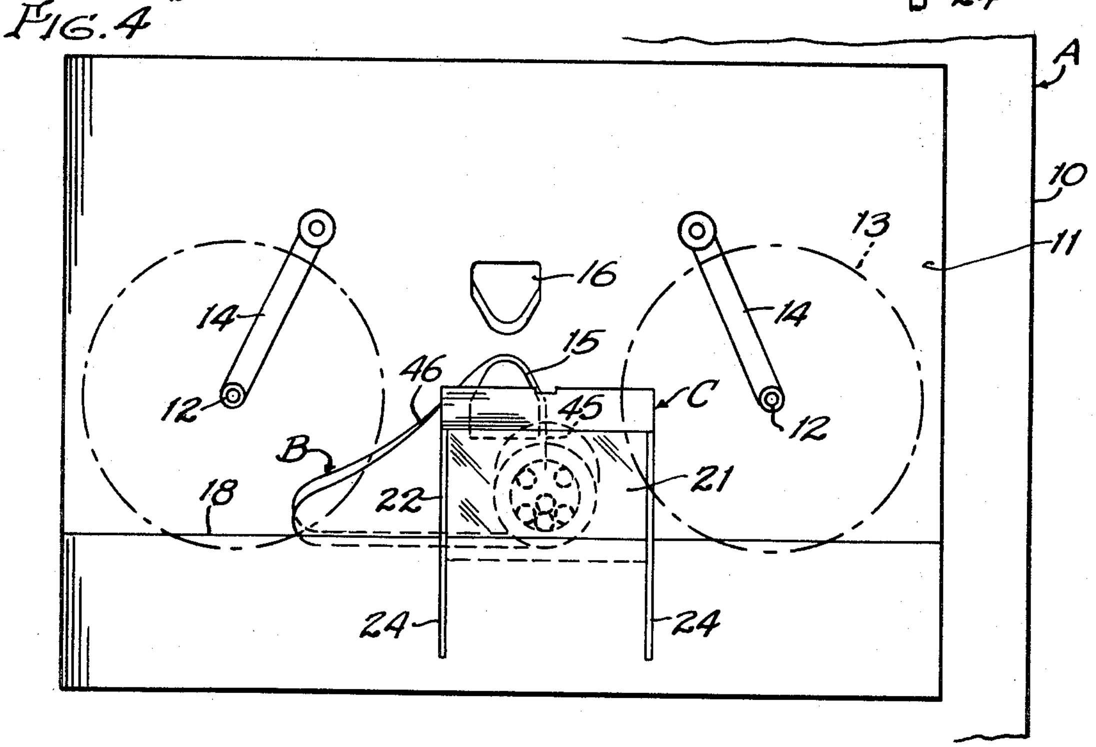
FIG. 4 is a front elevational view of the reading unit and cassette assembly, viewed along a horizontal line of sight.

Referring now to the drawings in detail, and in particular to FIGS. 1–4, I have shown therein, as one form in which the invention may be embodied, an assembly of tape-reading unit A, control tape B, and tape holding and feeding cassette C attached to the cabinet of reading unit A.

Tape reading unit A (FIG. 4) may comprise a cabinet 10 defining a compartment 11 in which is contained a pair of spindles 12 for tape reels 13 (shown in phantom) and tape-tensioning roller arms 14 for controlling the feeding of tape from one reel past a reading head 15 to the other reel on which it is wound in the normal operation of such a reading unit. The reading head 15 may embody a row of photo-cells responsive to a light beam projected through a pattern of apertures (not shown) in the tape B, from a projector unit 16 mounted in close proximity to head 15 and separated therefrom by a narrow pass through which the tape is fed. It is immaterial to the invention whether the reading unit and tape are of this type or of any other type that can be satisfactorily utilized in a machine control operation. For example, the invention is equally applicable to a known reader embodying mechanical trip fingers of a reader head at the top, the fingers reaching downwardly and dropping through the tape apertures to establish electrical contact; or it can be applied to a reader having a photo-cell pickup above and a light source below the tape. Head 15 is provided with a motor-driven drive sprocket (FIG. 2) engageable with sprocket apertures 18 in tape B to provide a positive drive for drawing the tape over the head at a variable speed such that the various machining operations directed by the tape messages may be executed satisfactorily. In the particular reading unit shown in FIGS. 1–4, the cabinet 10 has, in the lower area of compartment 11, a transverse vertical panel 20 which is spaced from a rear wall 19 of the compartment, beneath the reading head 15.

Cassette C comprises, in general, a casing 21 and an attachment means which, in the form shown in FIGS. 1–4, comprises a pair of laterally spaced bracket arms 22 each having a notch 23 to receive the upper margin of cabinet panel 20 and a finger 24 extending downwardly from the notch and having a straight front edge 25 for positioning abutment against the outer face of panel 20. Finger 24 and its abutment edge 25 are disposed in downwardly diverging relation to the major plane of casing 21 at an angle such as to dispose the casing in a position inclined upwardly and outwardly with reference to the major vertical plane of the cabinet 10, with the lower portion of the casing 21 extending into compartment 11 and beneath reading head 15.

Casing 21 can be of rectangular or circular box form, having a front wall 26 and a detachable back panel 27 spaced therefrom by a dimension slightly greater than the width of tape B so as to confine a coil 28 of the tape in a proper position for feeding to the head 15. Mounted on respective stub shafts 31 anchored in back wall 26 are a plurality of freely rotatable rollers 32 in a circumferential array such that the innermost turn of coil 28 may bear on all of the rollers for rotation of the coil about the axis of the roller array. Two of the rollers at the bottom of the array are spaced on opposite sides of the vertical plane of such axis (the medial plahe of casing 21) and between these two bottom rollers, a guide roller 34 is rotatably mounted on a shaft 35 anchored in bottom wall 26 located in such medial vertical plane. A retainer washer or clip 36 attached to the free end of shaft 35, retains roller 34 against escape from the shaft. Below the roller 34, and also located in the medial vertical plane, is a stub shaft 37 (also anchored in rear wall 26) on which is rotatably mounted a cone roller 38 spaced below roller 34 by a gap of width substantially equal to the thickness of tape B.

From the bottom of the internal circumference of coil 28, tape B passes between rollers 34 and 38 upwardly around roller 34 on a path which is diagonally related to the major plane of the casing in a manner such that the tape will be fed vertically upwardly to the reading head 15. To properly direct the tape in this path, the roller shaft 35 is positioned with an inclination intermediate the horizontal and the inclination of rollers 32, so that tape B may pass snugly around roller 34, in full contact therewith throughout its width, after undergoing a twist at 39 (FIG. 3) in traversing from the last roller 32 to the guide roller 34. It will be noted that the rollers 32 (FIG. 2) are normal to the major plane of casing 21 and hence are inclined upwardly and forwardly in the operative position of the cassette. Roller 38 is retained against creeping axially on its shaft 37, by means of a retainer clip 40 at its base (FIG. 2).

Cover 27 is provided with a slot 41 embracing the vertical plane of roller 34, so that the tape may exit from the casing 21 along the vertical path on which it feeds to reading head 15.

In the lower corner of casing 21 on the opposite side of roller 34 from the side past which the tape travels through exit slot 41 is an entry opening 42 for return of the tape to the lower side of coil 28, on a horizontal path.

Tape B includes the coil 28, the vertical stretch 45 rising from the inside of the coil through slot 41 to the reading head 15, and an external loop 46 which circles freely away from reading head 15 and thence back into cassette C in response to rotation of coil 28.

I find that endless tapes of a length in the range from a few feet up to 150 feet can satisfactorily be handled by the cassette. As soon as one machining cycle is completed, the tape will be in position to immediately commence another cycle. The rollers 32 may be arranged in an array of four (as shown) or of five or more, or of only three rollers, being spaced generally equidistantly around a common circumference of the axis of the array.

FIGS. 5 and 6 illustrate how the cassette can be of circular form, indicated by the reference character C1. They also illustrate an alternative means which can be employed for mounting the casing 21. A bracket 50, mounted at 51 to cabinet A, is provided with fingers 52 for engagement in sockets 53 in the bottom of casing 21.

Figures 7, 8:
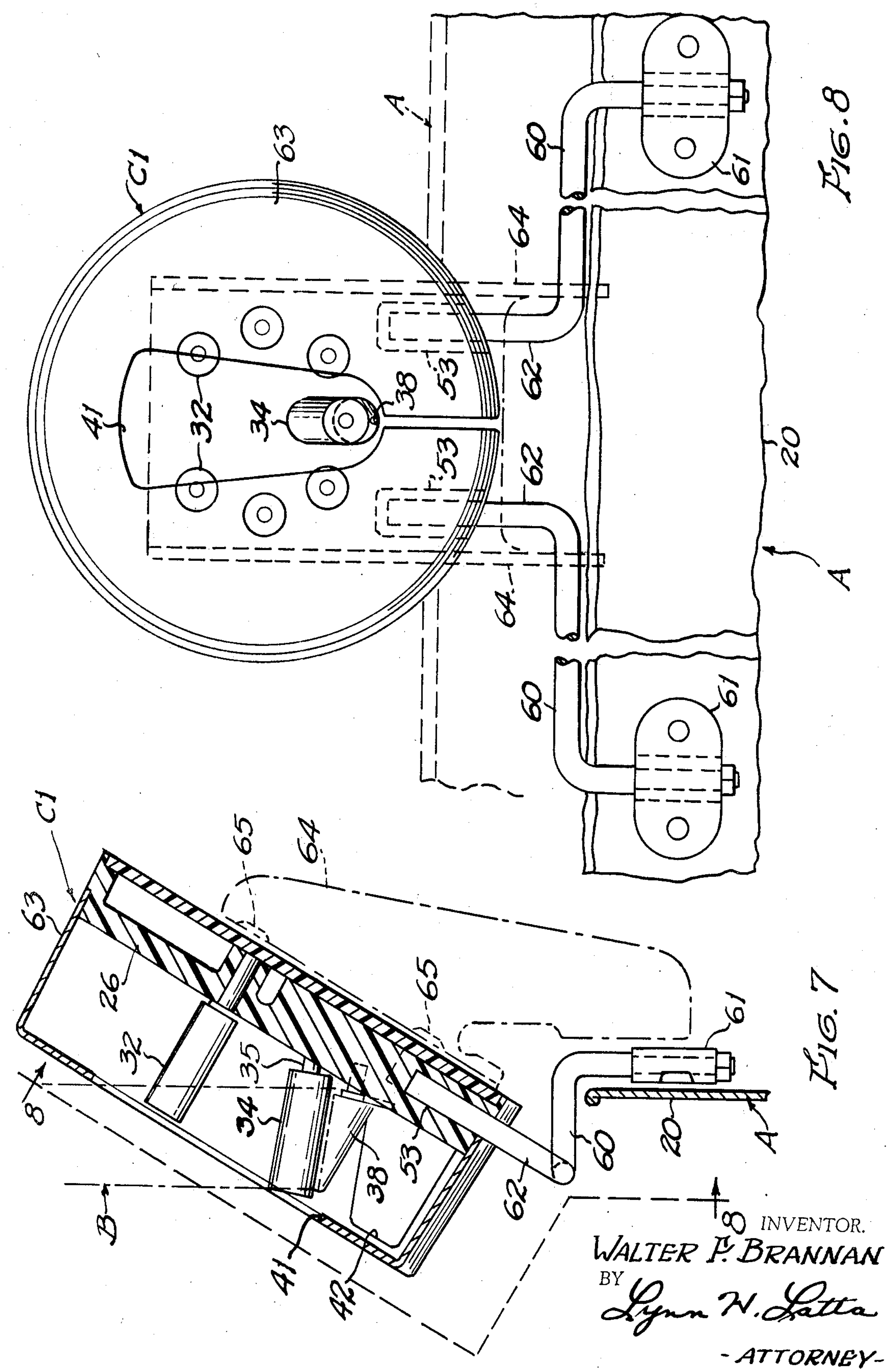
FIG. 7 is a vertical sectional view of another form.
FIG. 8 is a front elevational view thereof, taken on line 8—8 of FIG. 7.

FIGS. 7 and 8 illustrate another mounting arrangement which can be used in some installations. A pair of bracket arms 60, pivotally mounted in fittings 61 secured to cabinet A for forward swinging movements, have on their swinging ends respective fingers 62 which are engageable in sockets 53 in the bottom wall 26 of cassette C. To provide for easy detachment of the cover, it is made in the form of a split ring with two arms separated by radial slot 66, and of resilient material such that the arms will spread slightly to receive an annular shoulder 67 on bottom 26 when the cover is pushed into coupling connection with the bottom, and will then grasp the shoulder frictionally to maintain the coupling.

I claim:

1. For use in conjunction with a tape-controlled machine including a built-in reading head having rotatable drive means for drawing the tape thereover, a cassette for holding and feeding an annular coil of endless tape to said head and for receiving and rewinding such tape as it is returned from said head in response to drive imparted to the tape by said drive means, said cassette comprising:

a casing having opposed front and back walls to embrace the flat sides of said coil so as to confine it for rotation in a fixed plane, said front wall having a tape-exit opening;

means in said casing bearing on said coil to constrain it for rotation in the fixed plane;

means for detachably mounting said casing on said machine in a position wherein said front wall is contiguous to said reading head, said fixed plane is tilted so as to intersect the plane of travel of said tape to and from said head and to subtend an acute dihedral angle with said plane of travel, and said opening is pierced by the path of travel of said tape from the cassette to said head;

said cassette being operatively associated with said reading head upon attachment of said mounting means to said machine and separable from said head and drive means upon detachment from the machine;

a guide in said casing, extending through the central opening of said coil at an angle to the coil axis such that a stretch of the tape may leave the interior of the coil, passing around said guide, and may then exit through said coil opening and through said exit opening at an acute angle to the plane of said front wall in the area thereof nearest to said head;

said guide being in the form of an idler roller disposed adjacent one side of said central opening;

and a cone roller disposed with its rotational axis in a common plane with that of said idler roller, said cone roller being interposed between said idler roller and the internal circumference of said coil and with its opposite sides in close parallel association with said idler roller and said internal circumference respectively, such that the tape will pass between and be confined closely by said idler roller and said cone roller as it leaves the internal circumference of the coil.

2. A cassette as defined in claim 1, in combination with said coil and said reading head and drive means:
said casing projecting downwardly and underneath said reading head;
said guide comprising a roller disposed adjacent the bottom of the internal circumference of said coil and said stretch of tape extending upwardly in a straight line from said guide roller directly to said head.

3. Apparatus as defined in claim 2, wherein said reading head is one of two vertically spaced members between which said tape travels, said tape looping over the lower of said two members.

4. A cassette as defined in claim 1 wherein said bearing means consists of a plurality of rollers carried by said casing in a circumferential array such as to determine said fixed axis of rotation, said rollers being disposed within said coil for rolling contact with its internal circumference.

5. A cassette as defined in claim 4, wherein said guide is an idler roller disposed between two of said bearing rollers and adjacent to a side of the internal circumference of the coil.

6. A cassette as defined in claim 1, wherein said cone roller has a taper corresponding to the angle subtended between the internal surface of said coil and an opposed side of said idler roller.

7. A Cassette as defined in claim 4, said circumferential array of rollers having respective stub shafts anchored to said front wall and being rotatable on their respective shafts, said front wall being removably attached to said casing.

* * * * *